United States Patent [19]

Erskine

[11] Patent Number: 5,491,646

[45] Date of Patent: Feb. 13, 1996

US005491646A

[54] PRODUCTION OF ANAGLYPHS

[76] Inventor: Stephen P. E. Erskine, Benjy's Cottage, Uffington, Oxfordshire, SN7 7RB, England

[21] Appl. No.: 982,672

[22] Filed: Nov. 20, 1992

[30] Foreign Application Priority Data

Nov. 20, 1991 [GB] United Kingdom ............... 9124613

[51] Int. Cl.$^6$ .................................................. G02B 27/02
[52] U.S. Cl. ........................... 364/526; 356/12; 395/119
[58] Field of Search ...................................... 364/514, 526; 359/464, 478, 462, 466; 354/112; 395/119; 356/12; 353/7

[56] References Cited

U.S. PATENT DOCUMENTS

| | | | |
|---|---|---|---|
| 4,009,951 | 3/1977 | Ihms ........................................ | 359/464 |
| 4,134,644 | 1/1979 | Marks et al. . | |
| 4,290,675 | 9/1981 | Beiser ...................................... | 354/112 |
| 4,480,263 | 10/1984 | van Merode . | |
| 4,558,359 | 12/1985 | Kuperman et al. ...................... | 359/478 |
| 4,620,770 | 11/1986 | Wexler ..................................... | 359/464 |
| 4,625,290 | 11/1986 | White ....................................... | 395/119 |

FOREIGN PATENT DOCUMENTS 2114395  8/1983  United Kingdom .

*Primary Examiner*—Emanuel T. Voeltz
*Assistant Examiner*—Thomas Peeso
*Attorney, Agent, or Firm*—Young & Thompson

[57] ABSTRACT

A method for producing and anaglyph includes the steps of: producing a first image color record having at least two color numbers per pixel and representing the distribution of at least first and second image colors in one of the images of a stereo pair of images; producing a second image color record having at least one color number per pixel and representing the distribution of a least a third image color in the other of the stereo pair of images; combining the first image color record with the second image color record to produce an anaglyph color record having at least three color numbers per pixel, the three color numbers of the anaglyph color record corresponding to first, second and third anaglyph colors, and anaglyph color record representing the distribution of the anaglyph colors in the anaglyph.

14 Claims, No Drawings

PRODUCTION OF ANAGLYPHS

The invention relates to a method for producing anaglyphs.

In this specification, an anaglyph is defined as any two dimensional image which, when viewed through anaglyph spectacles, gives the appearance of being a three dimensional image.

Anaglyph spectacles ar defined as any device which ensures that each eye of a person viewing the anaglyph receives from the anaglyph a different frequency distribution of light.

Anaglyphs are conventionally formed from two photographs, or two motion films, which have been taken from slightly different positions, usually spaced laterally apart by a distance corresponding to the separation between a person's eyes, so as to produce two slightly different images, commonly referred to as a stereo pair of images, One of the images is usually coloured red and the other blue or green so that, when the two images are viewed through spectacles having one red lens and one blue lens, one eye sees one image and the other eye sees the other image, thus giving the appearance of depth. The two images are normally superposed.

Computer-generated anaglyphs have also been formed by combining image data for two differently coloured monochrome images. An image may be stored by a computer in the form of a colour record. In this specification a colour record is defined as a sequence of numbers representing the colour distribution of an image. The image is divided into pixels, and the colour record contains a series of numbers, or groups of numbers, each number, or group of numbers, representing the colour of an individual pixel. A number of different formats are commonly used for such colour records, and the particular format employed depends to a large extent upon the amount of information which can be stored by the computer. Thus, computer using 8 bits per pixel can use a maximum of 256 colours in any one image, whereas a computer using 24 bits per pixel can use up to 16,77,214 different colours.

In some formats the colour record contains three separate numbers for each pixel of the image, the three numbers representing the respective amounts of three different colours present in the pixel. For example, in the "Truevision Targa-24" format the colour record had eight bits representing the amount of red in the first pixel, followed directly by eight bits representing the amount of green in the first pixel, then eight bits for the amount of blue in the first pixel, followed by 8 bits for the red in the second pixel, and so on for every pixel of the image. In this specification, such numbers are referred to as colour numbers. That is, a colour number represents the amount of a particular colour, usually one of three, in a particular pixel. The colour numbers need not represent the colours red, green and blue respectively, although red, green and blue have been found to be capable of producing an enormous range of colours, when combined in different proportions, and are therefore the most popular choice. Whichever format is used, it is always possible to transform the colour record to a different format, although if the new format uses fewer bits per pixel then some loss of colour range will usually occur.

Anaglyphs produced by computer have been formed by combining image data for two differently coloured monochrome images so as to form a single image, i.e. an anaglyph, which can be displayed on a VDU.

However, anaglyphs formed as described above, using either photography or a computer, where each original image is monochrome, have not been found to produce a particularly broad or realistic range of colours when viewed through anaglyph spectacles.

SUMMARY OF THE INVENTION

According to the invention there is provided a method for producing an anaglyph, the method including the steps of: producing a first image colour record having at least two colour numbers per pixel and representing the distribution of at least first and second image colours in one of the images of a stereo pair of images; producing a second image colour record having at least one colour number per pixel and representing the distribution of at least a third image colour in the other of the stereo pair of images; combining the first image colour record with the second image colour record to produce an anaglyph colour record having at least three colour numbers per pixel, the three colour numbers of the anaglyph colour record corresponding to first, second and third anaglyph colours, and the anaglyph colour record representing the distribution of said anaglyph colours in the anaglyph.

The method may also include the step of displaying the anaglyph corresponding to the anaglyph colour record.

It will be appreciated that the visual image resulting from viewing such an anaglyph through anaglyph spectacles may comprise colours produced by any combination of the three anaglyph colours. Therefore, such an image may be more colourful and/or realistic than images derived from conventionally produced anaglyphs.

It will also be appreciated that the stereo pair of images need not correspond to any real physical object, and could, for example, be generated by a computer and, of course, the method according to the invention is particularly suitable for performance by a computer.

Preferably, the three anaglyph colours are chosen so that no one of the three anaglyph colours can be formed by any combination of the other two anaglyph colours.

It is also preferable that the three image colours are chosen so that no one of the three image colours can be formed by any combination of the other two image colours.

Conveniently, the three image colours are chosen to be the same as the three anaglyph colours.

In one embodiment of the invention, the first and second image colour records each have at least three colour numbers per pixel, the three colour numbers corresponding respectively to the three image colours.

The method may also include the step of adjusting the values of the colour numbers corresponding to at least one of the image colours in at least one of the image colour records, preferably before the two image colour records are combined.

For example, if the first image colour record contains colour numbers corresponding to the third image colour, then these colour numbers may be adjusted so that the third image colour is entirely, or almost entirely, removed from said one of said stereo pair of images.

Additionally or alternatively, if the second image colour record contains colour numbers corresponding to the first image colour then these colour numbers may be adjusted so that the first image colour is entirely, or almost entirely, removed from said other of said stereo pair of images.

Each colour number in the first image colour record corresponding to the second image colour may be adjusted so that the amount of the second image colour present in said one of said stereo pair of images is reduced by between 10% and 40%, or by between 20% and 30%, relative to the amount of the first image colour in said one of said stereo pair of images.

If the second image colour record contains numbers corresponding to the second image colour, then these colour numbers may be adjusted so as to entirely, or almost entirely, remove the second image colour from said other of said stereo pair of images.

Preferably, the step of combining the first and second image colour records includes calculating the average amount of each image colour present in corresponding pixels of the two images of said stereo pair of images, and assigning values to the colour numbers of the anaglyph colour record in such a way as to ensure that each pixel of the anaglyph contains an amount of each image colour equal, or substantially equal, to the average amount of the image colour present in the corresponding pixels of said two images.

The steps of producing the first and second image colour records may include digitising images of an object, which images have been formed by any kind of electromagnetic radiation reflected from, or emitted by, the object.

The invention also provides apparatus for performing any of the methods described above, the apparatus comprising digitising means for digitising information relating to the distribution of colours in a stereo pair of images, processing means for adjusting the colour numbers of the first and second image colour records, and for combining the first and second image colour records so as to produce the anaglyph colour record, and display means for displaying the anaglyph corresponding to the anaglyph colour record.

The processing means may be a dedicated micro-processor, or a computer, or personal computer, set up to run a suitable program.

The invention also provides, in a second aspect thereof, a method of encoding information by means of a stereo pair of images, wherein each image comprises an array of shapes, for example dots, the shapes being so arranged that, when the stereo pair of images is viewed through a stereoscope, some of the shapes appear to be closer to the viewer then the other shapes, the information being in alphanumeric form and being contained in the arrangement of the shapes which appear to be closer to the viewer, or of those shapes which appear to be further away from the viewer, and such information not being perceivable by viewing either image alone.

A stereoscope is any device which enables one eye of the viewer to see only one image, and the other eye of the viewer to see only the other image, of a stereo pair of images.

It will be appreciated that the encoded information stored by means of such a stereo pair of images could be revealed by means of a computer, without the need for a person to actually view the stereo pair of images, if the computer were to be provided with information relating to the two arrays.

The invention also provides a stereo pair of images when produced by the above method.

In one embodiment of the invention, the shapes of at least one of the images are arranged as a random array.

DESCRIPTION OF THE PREFERRED EMBODIMENT

One example of the invention will now be described.

A stereo pair of images corresponding to two full colour photographs is stored in digital form by a computer in two image files. This can be done by using a so called "flat bed colour scanner" in known manner. The photographs are simply placed on the flat bed scanner, which then converts the information stored in the photographs into digital form. The two image files are stored in "Truevison Targa-24" format which uses 24 bits per pixel, 8 bits for red, 8 bits for green, and 8 bits for blue.

Before the two image files are combined to produce an anaglyph, all of the colour numbers corresponding to green and blue in the second image file are set to zero, the colour numbers corresponding to red in the first image file are also set to zero, and the colour numbers corresponding to green in the first image file are reduced by 25%, i.e. by multiplying each colour number corresponding to green in the first image file by 0.75.

The two image files are then combined using a program called "Average" which is part of a software package called "ImageTools" written by John Bridges. This software enables the two image files to be averaged to produce a single image file. That is, the single image file is generated by averaging the value of each colour number of each pixel in the first of the two image files with the value of the same colour number of the corresponding pixel in the second of the two image files. The resulting single file then corresponds to an anaglyph, in accordance with the present invention.

The resulting anaglyph therefore contains a large range of colours formed from different combinations of red, green and blue. The anaglyph may be displayed on VDU, or colour printer, and viewed through a pair of anaglyph spectacles having one red filter and one cyan blue filter, to give an appearance of depth.

It is not fully understood how the human brain combines the two images to produce the visual sensation of a multi-coloured image. It might be thought at first sight that, because the lenses are red and blue, only colours formed by combining the two colours red and blue will be observed. However, it has been found that a very large range of colours can be observed when the anaglyph is viewed through such anaglyph spectacles, and that the appearance of the anaglyph is very close to that of the original photographs, as regards colour. This may be due to the fact that the red and blue lenses let through a range of different colours in addition to red and blue.

It will be appreciated that in the above method, since the colour numbers corresponding to green and blue in the second image file are set to zero, the same effect may be achieved by omitting such colour members from the second image file ab initio. The second image file will then contain only information relating to the red colour content of one of the images, and similarly the second image file may only contain information relating to the green and blue colour content of the other image. It follows, therefore, that image files suitable for generating an anaglyph could be formed by scanning one of the two photographs with the flat bed scanner set to receive and/or transmit one combination of colours, in this case only red, and by scanning the other of the two photographs with the flat bed scanner set to receive and/or transmit a different combination of colours, in this case blue and 75% green. Furthermore, it is possible to conceive of applications of the invention which allow an object which has been designed by, or with the aid of, a computer to be coloured by an operator. The computer could then create a stereo pair of image files, one containing only red colour numbers, and the other containing only green and blue colour numbers, which could then could be combined to form the image file of an anaglyph which would appear in full colour when viewed through anaglyph spectacles having a red and a blue filter.

It will also be appreciated that, because it is possible to use different combinations of different colours to form the same colour, the three colours used in the image file for the anaglyph need not necessarily be the same as the three colours which are used in the two image files for the initial stereo pair of images, although it will usually be convenient to use the same three colours for all of the image files.

Anaglyphs produced by the above method may be displayed on computers with colour display systems, or output via appropriate software and hardware to devices such as colour television screens, colour video printers, and a variety of colour hard copy devices; or they may be transferred, for example by modem, to sites where such equipment is available. Anaglyphs corresponding to stereo pairs of images taken from a wide variety of sources may be created by this method. Such sources include photographs, slides, photogrammetric images, medical images, and images created "de novo" using a computer. A monochrome stereo pair of images may be pseudo-coloured before being converted into anaglyphs in order to facilitate and enhance the interpretation or analysis of the anaglyph. Furthermore, a sequence of anaglyphs may be created to give the appearance of a moving subject. The invention has potential applications in the fields of, for example, photogrammetry (including mapping, satellite image analysis, and oil exploration), medicine, natural science, computer aided design, architecture, archaeology, meteorology, entertainment and defence. Furthermore, all that is required in order to perform the method is a personal computer with a suitable colour display system and a pair of anaglyph spectacles.

What I claim is:

1. A method for producing an anaglyph, the method including the steps of:

producing a first digital image colour record representing a first image of a stereo pair of images;

producing a second digital image colour record representing a second image of said stereo pair of images;

each digital image colour record including a series of colour numbers representing the colours respectively of an array of visible individual coloured pixels into which the respective image is divided;

said first digital image colour record having at least two colour numbers for each pixel of the first image, said two colour numbers representing the proportions respectively of first and second image colours in the colour of the respective pixel;

said second digital image colour record having at least one colour number for each pixel of the second image, said one colour number representing the proportion of a third image colour in the colour of the respective pixel;

combining said first digital image colour record with said second digital image colour record, to produce a single anaglyph digital colour record, by mathematically processing the colour numbers of the first and second image records respectively in a manner to derive a third series of colour numbers, said third series of colour numbers constituting said single anaglyph digital colour record and representing the colours respectively of an array of visible individual coloured pixels defining an anaglyph;

said single anaglyph digital colour record having at least three colour numbers for each pixel of the anaglyph, said three colour numbers representing the proportions respectively of first, second and third anaglyph colours in the colour of the respective pixel.

2. A method of producing an anaglyph as claimed in claim 1, which further includes the step of displaying the anaglyph corresponding to the anaglyph colour record.

3. A method as claimed in claim 1, wherein the three anaglyph colours are chosen so that no one of the three anaglyph colours can be formed by any combination of the other two anaglyph colours.

4. A method as claimed in claim 1, wherein the three image colours are chosen so that no one of the three image colours can be formed by any combination of the other two image colours.

5. A method as claimed in claim 1, wherein the three image colours are chosen to be the same as the three anaglyph colours.

6. A method as claimed in claim 1, wherein the first and second image colour records each have at least three colour numbers per pixel, the three colour numbers corresponding respectively to the three image colours.

7. A method as claimed in claim 1, which further includes the step of adjusting the values of the colour numbers corresponding to at least one of the image colours in at least one of the image colour records.

8. A method as claimed in claim 7, wherein the step of adjusting the colour numbers is carried out before the two image colour records are combined.

9. A method for producing an anaglyph, the method including the steps of:

producing a first digital image colour record representing a first image of a stereo pair of images;

producing a second digital image colour record representing a second image of said stereo pair of images;

each said digital digital colour record including a series of colour numbers representing the colours respectively of an array of visible individual coloured pixels into which the respective image is divided;

said first digital image colour record having three colour numbers for each pixel of the first image, said three colour numbers representing the proportions respectively of first, second and third image colours in the colour of the respective pixel;

said second digital image colour record having at least one colour number for each pixel of the second image, said one colour number representing the proportion of said third image colour in the colour of the respective pixel;

adjusting the colour numbers of the first image colour record so that said third image colour is entirely, or almost entirely, removed from said first image of the stereo pair of images;

combining said first image colour record with said second image colour record, to produce a single anaglyph digital colour record, by mathematically processing the colour numbers of the first and second image records respectively in a manner to derive a third series of colour numbers, said third series of colour numbers constituting said single anaglyph digital colour record and representing the colours respectively of an array of visible individual coloured pixels defining an anaglyph;

said single anaglyph digital colour record having at least three colour numbers for each pixel of the anaglyph, said three colour numbers representing the proportions respectively of first, second and third anaglyph colours in the colour of the respective pixel.

10. A method for producing an anaglyph, the method including the steps of:

producing a first digital image colour record representing a first image of a stereo pair of images;

producing a second digital image colour record representing a second image of said stereo pair of images;

each digital colour record including a series of colour numbers representing the colours respectively of an array of visible individual coloured pixels into which the respective image is divided;

said first digital image colour record having at least two colour numbers for each pixel of the first image, said two colour numbers representing the proportions respectively of first and second image colours in the colour of the respective pixel;

said second digital image colour record having at least two colour numbers for each pixel of the second image, said two colour numbers representing the proportions respectively of said first colour and a third image colour in the colour of the respective pixel;

adjusting the numbers of the second image colour record so that said first digital image colour is entirely, or almost entirely removed from said second digital image of the stereo pair of images;

combining said first digital image colour record with said second digital image colour record, to produce a single anaglyph digital colour record, by mathematically processing the colour numbers of the first and second image records respectively in a manner to derive a third series of colour numbers, said third series of colour numbers constituting said single anaglyph digital colour record and representing the colours respectively of an array of visible individual coloured pixels defining an anaglyph;

said single anaglyph digital colour record having at least three colour numbers for each pixel of the anaglyph, said three colour numbers representing the proportions respectively of first, second and third anaglyph colours in the colour of the respective pixel.

11. A method for producing an anaglyph, the method including the steps of:

producing a first digital image colour record representing a first image of a stereo pair of images;

producing a second digital image colour record representing a second image of said stereo pair of images;

each digital colour record including a series of colour numbers representing the colours respectively of an array of visible individual coloured pixels into which the respective image is divided;

said first digital image colour record having at least two colour numbers for each pixel of the first image, said two colour numbers representing the proportions respectively of first and second image colours in the colour of the respective pixel;

said second digital image colour record having at least one colour number for each pixel of the second image, said one colour number representing the proportion of a third image colour in the colour of the respective pixel;

adjusting the colour number in the first image colour record corresponding to the second image colour so that the amount of the second image colour present in said first image of the stereo pair of images is reduced by between 10% and 40%, or between 20% and 30%, relative to the amount of said first image colour in said first image of the stereo pair of images;

combining said first image colour record with said second image colour record, to produce a single anaglyph digital colour record, by mathematically processing the colour numbers of the first and second image records respectively in a manner to derive a third series of colour numbers, said third series of colour numbers constituting said single anaglyph digital colour record and representing the colours respectively of an array of visible individual coloured pixels defining an anaglyph;

said single anaglyph digital colour record having at least three colour numbers for each pixel of the anaglyph, said three colour numbers representing the proportions respectively of first, second and third anaglyph colours in the colour of the respective pixel.

12. A method for producing an anaglyph, the method including the steps of:

producing a first digital image colour record representing a first image of a stereo pair of images;

producing a second digital image colour record representing a second image of said stereo pair of images;

each digital colour record including a series of colour numbers representing the colours respectively of an array of visible individual coloured pixels into which the respective image is divided;

said first digital image colour record having at least two colour numbers for each pixel of the first image, said two colour numbers representing the proportions respectively of first and second image colours in the colour of the respective pixel;

said second digital image colour record having at least two colour number for each pixel of the second image, said two colour numbers representing the proportions respectively of said second digital image colour and a third image colour in the colour of the respective pixel;

adjusting the numbers of the second image colour record so that said second image colour is entirely, or almost entirely, removed from said second image of the stereo pair of images;

combining said first digital image colour record with said second digital image colour record, to produce a single anaglyph digital colour record, by mathematically processing the colour numbers of the first and second image records respectively in a manner to derive a third series of colour numbers, said third series of colour numbers constituting said single anaglyph digital colour record and representing the colours respectively of an array of visible individual coloured pixels defining an anaglyph;

said single anaglyph digital colour record having at least three colour numbers for each pixel of the anaglyph, said three colour numbers representing the proportions respectively of first, second and third anaglyph colours in the colour of the respective pixel.

13. A method for producing an anaglyph, the method including the steps of:

producing a first digital image colour record representing a first image of a stereo pair of images;

producing a second digital image colour record representing a second image of said stereo pair of images;

each digital colour record including a series of colour numbers representing the colours respectively of an array of visible individual coloured pixels into which the respective image is divided;

said first digital image colour record having at least two colour numbers for each pixel of the first image, said two colour numbers representing the proportions respectively of first and second image colours in the colour of the respective pixel;

said second digital image colour record having at least one colour number for each pixel of the second image, said one colour number representing the proportion of a third image colour in the colour of the respective pixel;

combining said first digital image colour record with said second digital image colour record, to produce a single anaglyph digital colour record, by mathematically processing the colour numbers of the first and second image records respectively in a manner to derive a third series of colour numbers, said third series of colour numbers constituting said single anaglyph digital colour record and representing the colours respectively of an array of visible individual coloured pixels defining an anaglyph;

said single anaglyph digital colour record having at least three colour numbers for each pixel of the anaglyph, said three colour numbers representing the proportions respectively of first, second and third anaglyph colours in the colour of the respective pixel;

said mathematical processing including calculating the average amount of each image colour present in corresponding pixels of the two images of said stereo pair of images, and assigning values to the colour numbers of the anaglyph colour record in such a way as to ensure that each pixel of the anaglyph contains an amount of each image colour equal, or substantially equal, to the average amount of that image colour present in the corresponding pixels of said two images.

14. A method for producing an anaglyph, the method including the steps of:

producing a first digital image colour record representing a first image of a stereo pair of images;

producing a second digital image colour record representing a second image of said stereo pair of images;

said first digital image color record and said second colour image color record being produced by digitising images of an object, which images have been formed by any kind of electromagnetic radiation reflected from, or emitted by, the object;

each digital colour record including a series of colour numbers representing the colours respectively of an array of visible individual coloured pixels into which the respective image is divided;

said first digital image colour record having at least two colour numbers for each pixel of the first image, said two colour numbers representing the proportions respectively of first and second image colours in the colour of the respective pixel;

said second digital image colour record having at least one colour number for each pixel of the second image, said one colour number representing the proportion of a third image colour in the colour of the respective pixel;

combining said first digital image colour record with said second digital image colour record, to produce a single anaglyph digital colour record, by mathematically processing the colour numbers of the first and second image records respectively in a manner to derive a third series of colour numbers, said third series of colour numbers constituting said single anaglyph digital colour record and representing the colours respectively of an array of visible individual coloured pixels defining an anaglyph;

said single anaglyph digital colour record having at least three colour numbers for each pixel of the anaglyph, said three colour numbers representing the proportions respectively of first, second and third anaglyph colours in the colour of the respective pixel.

* * * * *